July 4, 1944.   F. MARTINDELL   2,353,056
WELD STRENGTH TESTING APPARATUS
Filed March 26, 1942
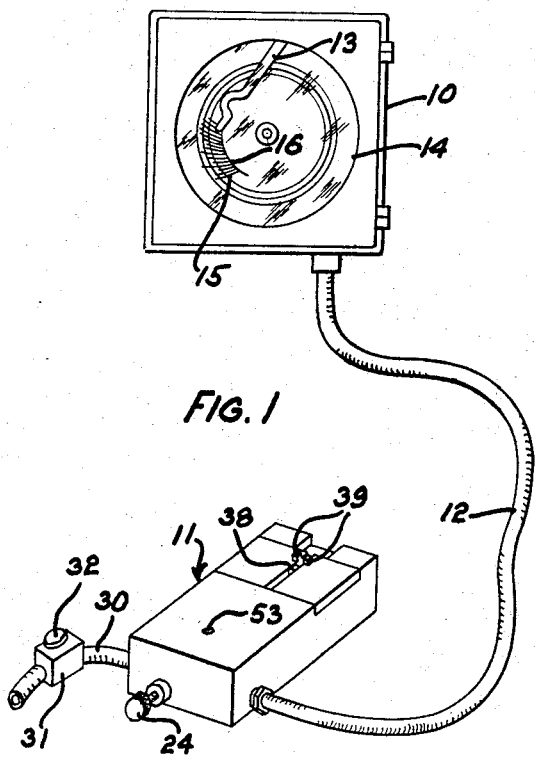
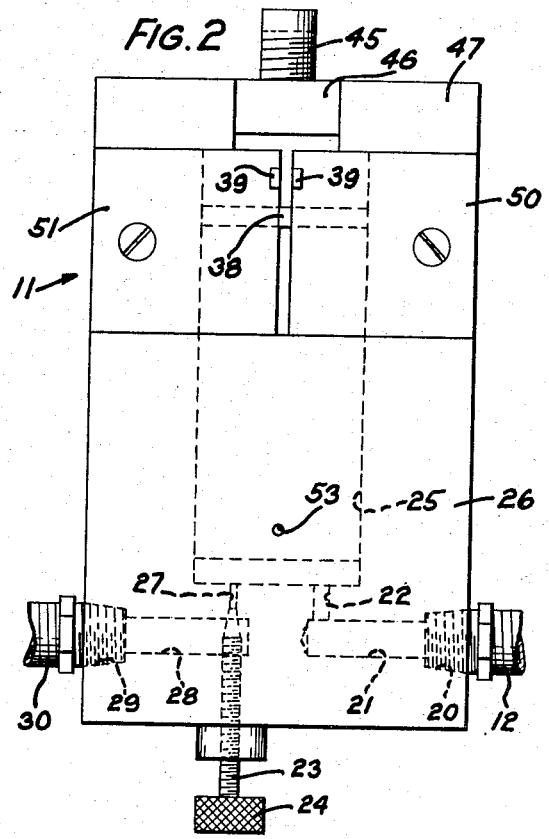
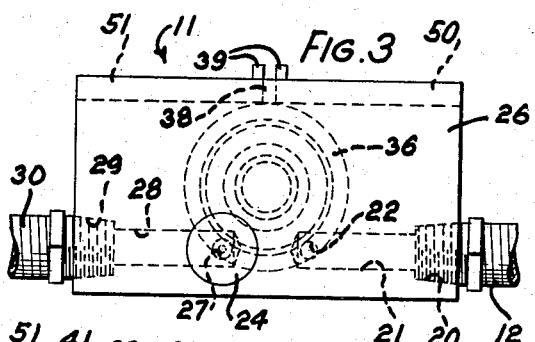
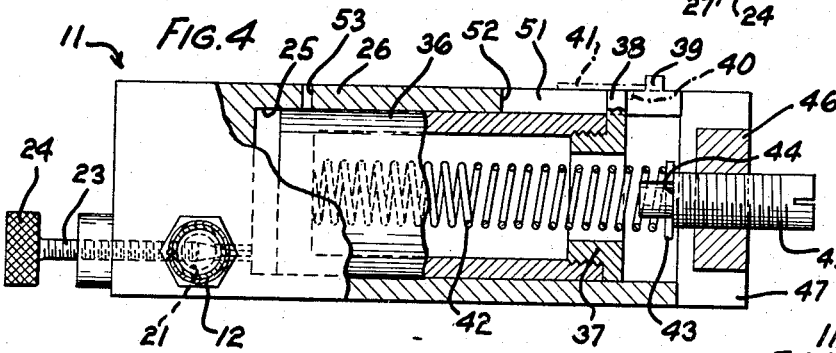
INVENTOR
F. MARTINDELL
BY *Harry L. Duft*
ATTORNEY Patented July 4, 1944

2,353,056

UNITED STATES PATENT OFFICE 2,353,056

WELD STRENGTH TESTING APPARATUS

Frank Martindell, Western Springs, Ill., assignor to Western Electric Company, Incorporated, New York, N. Y., a corporation of New York Application March 26, 1942, Serial No. 436,306

2 Claims. (Cl. 265—14)

This invention relates to weld strength testing apparatus and more particularly to a recording testing apparatus for testing the quality of welding of electrical contacts to contact springs.

In the manufacture of electrical switching apparatus, such as relays and other types of switches, particularly those used in the telephone industry, the process of attaching precious metal contacts to contact springs by welding has been almost universally adopted. Since it is essential that these contacts have a long life of service, various devices have been provided for testing to destruction a small percentage of welds connecting the precious metal contacts to the contact springs in order to determine the quality of the welded joint between the contact and the spring which supports it. In following this practice, an operator of a welding machine may select, for example, one or two contacts out of each 100 or 200 contacts which have been welded to contact springs and measure the amount of energy it requires to strip the precious metal contact from the spring. By thus destroying the welded connection between one or two contacts out of 100 or 200 contacts, the operator is able to determine whether the welding device being used is functioning properly. Numerous devices have, in the past, been devised for performing this operation; for example, the apparatus shown in the patent to J. S. Stull of November 4, 1941, No. 2,261,783, wherein a manually actuated device for testing welds to destruction is disclosed.

It is an object of the present invention to provide a simple and efficient weld strength testing apparatus which will automatically record the amount of energy required to break a weld.

In accordance with one embodiment of the invention, there is provided a pneumatically actuated shearing mechanism for shearing precious metal contacts from contact springs and a recorder for automatically recording the amount of pressure applied to the contact to strip it from the contact springs. In this apparatus, air under pressure is admitted through a manually controlled valve to an air cylinder in which there is positioned a piston normally held in a retracted position by a coiled spring. The air under pressure will force the piston to carry a shearing member supported by it against a contact on a contact spring with sufficient force to shear the contact from the contact spring, which is, in turn, held against movement by an anvil fixed with respect to the cylinder. Any well-known type of pressure recording device may be connected with the cylinder to record the pressure applied to the piston to shear the contact from the contact spring. In the herein-described embodiment of the invention, a cardboard disc, driven by suitable mechanism, is provided on which the record of the successive welds tested may be marked by the needle of a recording pressure gage. The cylinder in the present embodiment of the invention is provided with an escape port so that when the contact is sheared from the contact spring and the piston moves beyond the shearing position, the air in back of the piston may escape through this port and in this manner, the highest pressure attained in the cylinder will be recorded on the record disc and after the contact is sheared from the contact spring, the pressure in the cylinder will immediately fall due to the escape of the air through the escape port. The interior walls of the cylinder and exterior walls of the piston are so proportioned that after a contact has been sheared from the contact spring, the piston may be returned to its normal position by its biasing spring.

A better understanding of the invention may be had by reference to the following detailed description of one embodiment thereof when considered in conjunction with the accompanying drawing, wherein Fig. 1 is a perspective view of the pressure applying mechanism and recording mechanism constituting the preferred embodiment of this invention;

Fig. 2 is a plan view of the mechanism for shearing a contact from a contact spring;

Fig. 3 is an end elevational view of the structure shown in Fig. 1; and

Fig. 4 is a side elevational view of the structure shown in Figs. 2 and 3, part being broken away to show the construction of the piston and cylinder.

By reference to the drawing, wherein like reference characters designate the same parts throughout the several views, particular reference being had at this time to Fig. 1, it will be seen that there is provided a pressure recording device 10 interconnected with a pneumatically actuated weld shearing mechanism 11 by a suitable hose or pipe connection 12. The pressure recording mechanism may be of any suitable type wherein a recording stylus 13 is moved through an arc proportional to the pressure of the air supplied to the recording device through the hose 12 and wherein the stylus 13 cooperates with a disc type record 14 to mark on the record 14 one line 15 each time a test is made in the weld shearing mechanism 11. The disc type record 14 may be driven in any suitable manner; for example, by a clock mechanism (not shown) or may be stepped forward each time a testing operation is performed, as is customary in recording devices of this type. It will be noted that the stylus 13, in marking the lines 15 on the record 14, starts at a point 16 and moves clockwise through varying distances depending upon the pressure within the pressure recording device 10.

The hose 12 is connected to a port 20 communicating with a passage 21. The passage 21 has in communication with it a smaller passage 22 which communicates with the interior 25 of a cylinder block 26. The interior 25 of the cylinder block 26 is in communication with a passage 27, the inlet of which receives the tapered end of a threaded member 23, provided with a knurled head 24. The threaded member 23 may be rotated to adjust the effective opening from a passage 28 into the passage 27, thereby to regulate the flow of air under pressure into the cylinder 26. An inlet port 29 is in communication with a passage 28. The inlet port 29 has a hose 30 connected thereto and to a source of air under pressure. There is provided in the hose 30 a manually operable valve 31, having an actuator plunger 32, which, upon operation, will permit air under pressure to flow through the hose 30 and passages 28 and 27 to the interior 25 of the cylinder block 26.

Positioned in the cylinder block 26 is a piston 36, having threaded into its right hand end (Fig. 4) a shouldered plug 37, having extending upwardly from it a shearing member 38 for cooperation with anvils 39—39 to shear a contact 40, as shown in dot and dash lines (Fig. 4) from a contact spring 41, also shown in dot and dash lines (Fig. 4).

The piston 36 is hollow and is normally urged to the left (Fig. 4) by a compression spring 42, compressed between the inside of the piston head and a washer 43, seated against a shoulder 44 of a threaded member 45. The threaded member 45 is threaded in a transversely extending portion of an end block 47, suitably fixed to the cylinder block 26. The anvils 39 are carried on plates 50 and 51 secured to the cylinder block 26 and positioned between a shoulder 52 formed on the cylinder block 26 and the end block 47. The cylinder block 26 is provided with an aperture or escape port 53 leading into the interior 25 of the cylinder block 26 but normally sealed from communication with the interior by the piston 36.

In the operation of the apparatus, a contact spring 41 having a contact 40 thereon, may be positioned with the end of the spring 41 abutting the anvils 39 and with the contact 40 in the path of the shearing member 38. Thus, valve 31 may be operated to admit air under pressure to the interior 25 of cylinder block 26. When air under pressure is admitted to the interior 25 of the cylinder, through hose 30, inlet port 29 and passages 28 and 27 by an operator actuating the plunger 32, the piston 36 will move to the right, to apply a shearing force, tending to shear contact 40 from contact spring 41. As the pressure in the interior of the cylinder 25 builds up, the pressure recording device, being in communication with the interior of the cylinder, will record the pressure and the stylus 13 will rock clockwise to inscribe a mark on the record disc 14. The length of the line 15 inscribed by the stylus on the record disc 14 will be proportional to the pressure within the cylinder 26 and the stylus 13 will continue to move clockwise so long as the pressure continues to increase within the cylinder 25. As soon as the contact 40 is sheared from the spring 41, the piston 36 will move rapidly to the right (Fig. 4) to move its left edge beyond the aperture or escape port 53 and thus if the flow of air into the interior 25 of the cylinder 26 is maintained by the operator holding the plunger 32 down, no appreciable pressure will build up within the cylinder due to the escape of the air through the aperture 53 and thus no false recordings will be made by the recording device 10.

The interior of the cylinder 25 and the exterior of the piston 36 are so proportioned that the spring 42 may force the piston 36 back to the position shown when no air under pressure is being delivered to the interior 25 of the cylinder and thus the apparatus will restore itself to normal as soon as the operator releases the actuator plunger 32.

What is claimed is:

1. A weld strength testing and recording apparatus comprising a pressure responsive recorder, a cylinder in communication with said recorder, means on said cylinder for holding one of a pair of welded-together articles against movement, a piston in said cylinder having means thereon for engaging the other of said pair of welded-together articles, resilient means for normally maintaining the piston in a predetermined position, means for supplying air under pressure to said cylinder to impart movement to the piston against the resilient means for shearing the welded-together members one from the other, and an escape port in said cylinder normally blocked by the piston and positioned to permit the air admitted under pressure thereto to escape directly from the cylinder solely by movement of the piston out of blocking association therewith after one of the articles has been stripped from the other article.

2. In an apparatus for testing welded joints and recording said tests, means for rigidly supporting an article to which a second article is attached by a welded joint, a cylinder, a piston in said cylinder having means thereon for engaging the second-mentioned article, means for maintaining said piston in a predetermined position within the cylinder, means for supplying air under pressure to said cylinder and acting against the action of said maintaining means, a recording device in connection with said cylinder for recording the pressures in said cylinder, and an escape port formed in the side wall of the cylinder adjacent the end of the piston and normally closed by the side of the piston, said port being uncovered by movement of the piston to permit air to escape directly from said cylinder when one of said articles has been sheared from the other, the escape port being positioned to communicate directly with the interior of the cylinder beyond the end of the piston when the piston moves.

FRANK MARTINDELL.